(12) United States Patent
Luehrmann et al.

(10) Patent No.: US 7,240,584 B1
(45) Date of Patent: Jul. 10, 2007

(54) CONNECTING ROD WITH PROFILED BORE FOR INCREASED LOAD CAPABILITY

(75) Inventors: Mark G. Luehrmann, Hope, IN (US); Mary E. Rupp, Greensburg, IN (US); Mark D. O'Leary, Seymour, IN (US); Ilya L. Piraner, Columbus, IN (US); John M. Miller, Columbus, IN (US); William D. McNulty, Scipio, IN (US); Cheryl Klepser, Hope, IN (US)

(73) Assignee: Cummins Engine Company, Inc., Columbus, IN (US)

(*) Notice: Subject to any disclaimer, the term of this patent is extended or adjusted under 35 U.S.C. 154(b) by 733 days.

(21) Appl. No.: 09/856,745

(22) PCT Filed: Dec. 10, 1999

(86) PCT No.: PCT/US99/29395

§ 371 (c)(1),
(2), (4) Date: Sep. 24, 2001

(87) PCT Pub. No.: WO00/34696

PCT Pub. Date: Jun. 15, 2000

Related U.S. Application Data (63) Continuation-in-part of application No. 09/210,001, filed on Dec. 11, 1998, now abandoned.

(51) Int. Cl.
*G05G 1/00* (2006.01)
(52) U.S. Cl. .................... 74/579 R; 384/192
(58) Field of Classification Search ........... 74/579 R, 74/595; 384/192
See application file for complete search history.

(56) References Cited

U.S. PATENT DOCUMENTS 1,789,840 A    1/1931   Rathbun (Continued)

FOREIGN PATENT DOCUMENTS

DE    10 04 871 B    3/1957

(Continued)

OTHER PUBLICATIONS

Tool Engineers Handbook, 1449 McGraw-Hill Book Company, pp. 1228-1229.

*Primary Examiner*—Chong H. Kim
(74) *Attorney, Agent, or Firm*—Sawyer Law Group LLP (57) ABSTRACT

An engine cylinder piston connecting rod subassembly, for use in an engine, includes a piston (53), a piston pin (52) and a connecting rod (51). The connecting rod has a piston end portion with a piston pin bore (62). The piston pin is inserted through the piston pin bore and oppositely disposed portions of the piston, for securing the piston and the connecting rod together. Opposite ends of the piston pin bore are machined or profiled with relief portions (60, 61), to allow for piston pin deflection and thereby maximize the load carrying capacity, by providing a greater area of contact. The relief portions can be a curved surface (65) machined as part of the bore, or a plurality of end-to-end angled frustoconical surfaces (66a, 66b, 66c). The relief portions are shaped to correspond to the shape of the corresponding piston pin when under load during normal engine operation.

10 Claims, 8 Drawing Sheets

U.S. PATENT DOCUMENTS

| | | | |
|---|---|---|---|
| 1,816,474 A * | 7/1931 | Eaton | 384/286 |
| 1,921,044 A | 8/1933 | Sparrow | 308/237 |
| 2,295,199 A | 9/1942 | Carvelli | 309/19 |
| 2,483,674 A | 10/1949 | Rosen et al. | 309/19 |
| 2,703,264 A | 3/1955 | Pitner | 309/19 |
| 3,161,185 A | 12/1964 | Justinien et al. | 123/78 |
| 3,424,138 A | 1/1969 | Dreisin | 123/41.38 |
| 3,479,929 A | 11/1969 | Fangman | 92/187 |
| 3,845,735 A * | 11/1974 | Bossler, Jr. | 116/208 |
| 3,994,054 A | 11/1976 | Cuddon-Fletcher | 29/156.5 |
| 4,198,879 A | 4/1980 | Hornak et al. | 74/579 |
| 4,291,614 A | 9/1981 | Mölle et al. | 92/187 |
| 4,350,056 A | 9/1982 | Ban et al. | 74/579 |
| 4,940,002 A * | 7/1990 | Bien | 384/192 |
| 5,628,577 A | 5/1997 | Ribeiro et al. | 403/150 |
| 5,913,608 A * | 6/1999 | Blume | 384/192 |

FOREIGN PATENT DOCUMENTS

| | | | | |
|---|---|---|---|---|
| DE | 3326467 | | 1/1985 | |
| DE | 3733982 A | * | 4/1989 | |
| FR | 1 300 937 A | | 8/1962 | |
| JP | 5797912 | * | 6/1982 | 74/579 R |

* cited by examiner

*Fig. 1*

(PRIOR ART)

Fig. 2

(PRIOR ART)

CONNECTING ROD WITH PROFILED BORE FOR INCREASED LOAD CAPABILITY

REFERENCE TO RELATED PATENT APPLICATION

The subject patent application is a continuation-in-part patent application of U.S. Ser. No. 09/210,001, filed Dec. 11, 1998, now abandoned.

BACKGROUND OF THE INVENTION

The present invention relates in general to the design of a piston-connecting rod subassembly for an engine, including the piston pin and in one embodiment the design of the connecting rod bushing. In a related embodiment the connecting rod bushing is eliminated. More specifically the present invention relates to the piston pin-connecting rod interface and in one embodiment the specific profiling of the bushing inside diameter (bore) for improved load distribution and in turn increased load capability. In the related embodiment the profiling is done to the piston pin bore in the connecting rod adjacent the end faces of the connecting rod. The profiled bore is coated by a surface treatment. At the same load levels, the present invention permits the use of a less expensive material for the connecting rod.

During engine operation, the movement of the cylinder and the cooperating action of the crankshaft place a significant load on the piston pin which in turn places a load on the inside diameter surface of the connecting rod bushing which receives the piston pin. The load on the piston pin causes the pin to experience a slight deflection or bending in the longitudinal direction and this places a stress concentration on the inside end edges of the connecting rod bushing. This type of edge loading has been found to contribute to fatigue cracks in the bushing as well as contributing to bushing scuffing and seizure. If the bushing is eliminated such that the piston pin fits directly against the bore in the connecting rod, the same issues and concerns exist. There is still edge loading as well as scuffing and seizure.

It would be an improvement to this situation if the loading on the connecting rod and/or the connecting rod bushing, due to the piston pin, could be more evenly distributed. A more even loading (i.e., load distribution) would reduce the stress concentration on the inside end edges. This improved load distribution solution would in turn allow lower cost materials to be used for the bushing and/or for the connecting rod. Another design option from this solution is to accommodate an increased load capability, while using the same connecting rod and/or bushing materials.

One embodiment of the present invention provides a solution to the bushing loading problem by changing the inside surface (bushing bore) shape (i.e., profiled) so that the shape of the bore generally coincides with the shape of the piston pin while under load. A profiled bore in the connecting rod bushing reduces piston pin edge loading and enables the use of lower strength and lower cost materials for the same designed load capability. The present invention enables the load capability, reliability, and durability targets of the engine to be maintained, while using a lower cost material. Alternatively, the present invention enables the load to be increased while using the same bushing materials which are currently in use.

The profiled bore in the connecting rod bushing is able to be machined at little or no additional cost as compared to full-length cylindrical bores. Without the present invention, the only realistic way to reduce the fatigue crack problem is to go to a higher strength and higher cost material for the bushing, if an acceptable bushing life is going to be provided.

In a related embodiment of the present invention, the bushing is eliminated and the ends of the piston pin bore in the small end of the connecting rod are profiled. The profiling provides the same load capacity benefits and the option of using a lower cost material which are present with the profiled bushing. In order to create or provide scuff and seizure resistance to the surface of the connecting rod bore, a surface treatment/coating is applied.

SUMMARY OF THE INVENTION

An engine cylinder piston-connecting rod subassembly for use in an engine according to one embodiment of the present invention comprises a piston, a connecting rod having a piston-end portion which is assembled into the piston, the piston-end portion defining a bushing bore, a connecting rod bushing having oppositely disposed ends and being assembled into the bushing bore, the connecting rod bushing defining a profiled pin bore which is shaped with an angled relief portion adjacent each end and a piston pin inserted through the profiled pin bore and into portions of the piston for securing together the piston and the connecting rod.

An engine cylinder piston-connecting rod subassembly for use in an engine according to another embodiment of the present invention comprises a piston, a connecting rod having a piston-end portion which is assembled into the piston, the piston-end portion defining a piston pin bore, the ends of the piston pin bore having profiled surface portions which are shaped to provide relief for piston pin deflection and a piston pin inserted into said piston pin bore for securing together the piston and the connecting rod.

One object of the present invention is to provide an improved connecting rod for use in a piston-connecting rod subassembly for an engine.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
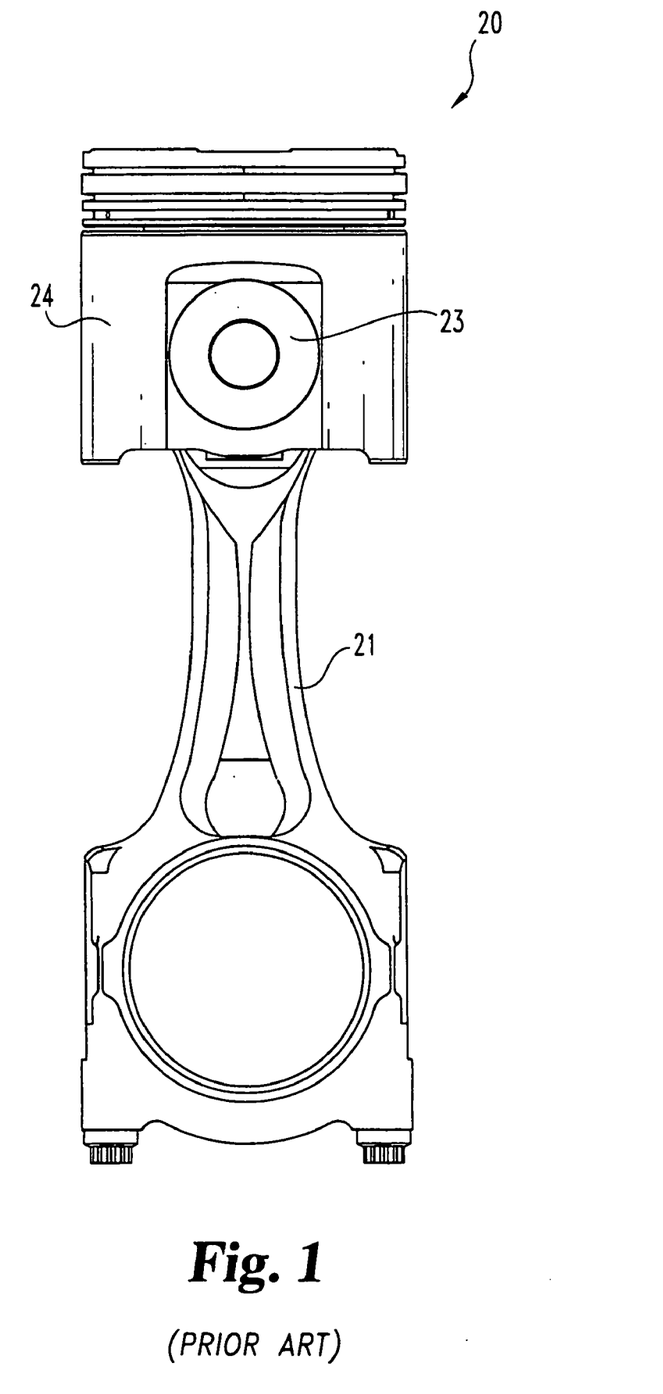
FIG. 1 is a front elevational view of a prior art piston-connecting rod subassembly.
Figure 2:
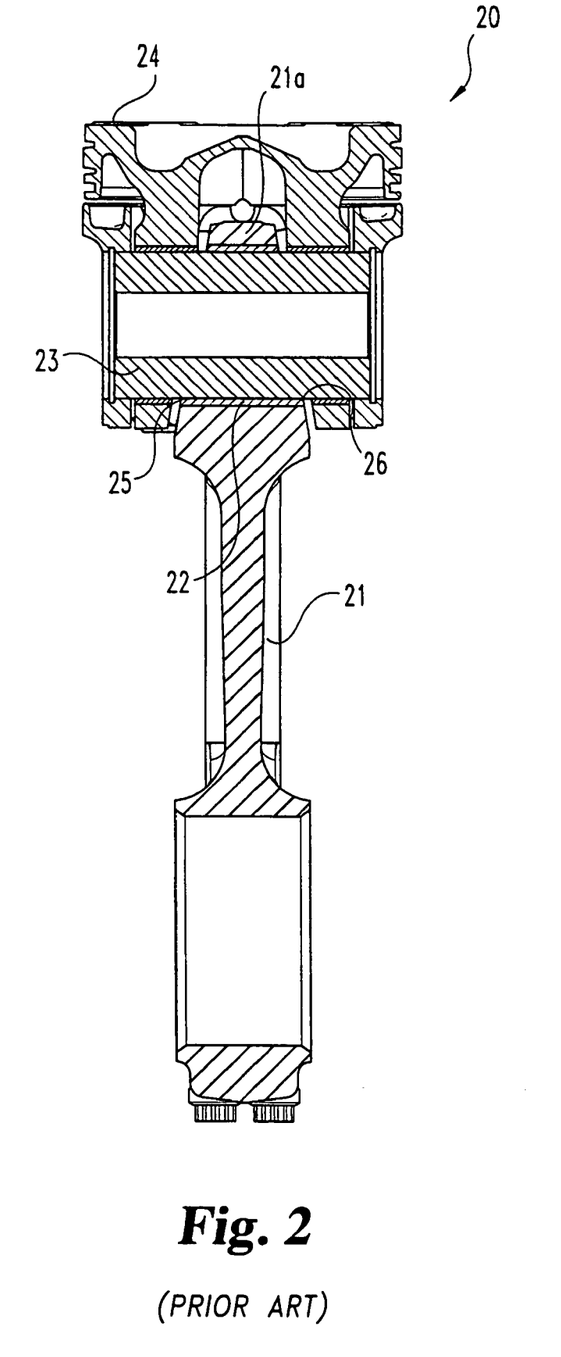
FIG. 2 is a side elevational view in full section of the FIG. 1 prior art subassembly.

Referring to FIGS. 1 and 2, there is illustrated a piston and connecting rod subassembly 20 which is typical of a prior art structure for use as part of an engine. The connecting rod 21 has a piston-end portion 21a which is sleeved with a hollow, cylindrical bushing 22 which receives piston pin 23. During the movement of piston 24 within its corresponding cylinder (not illustrated) and the cooperating movement of the connecting rod 21 relative to the cylinder and the crankshaft (not illustrated), a load is placed on the piston pin 23. The magnitude of the load applied to piston pin 23 is such that the pin deflects, bending longitudinally such that the inside end edges 25 and 26 of the bushing are subjected to edge loading. The magnitude of the forces applied to the inside end edges 25 and 26 of the bushing 22 are sufficient to contribute to fatigue cracks in the bushing as well as bushing scuffing and seizure.

Figure 3:
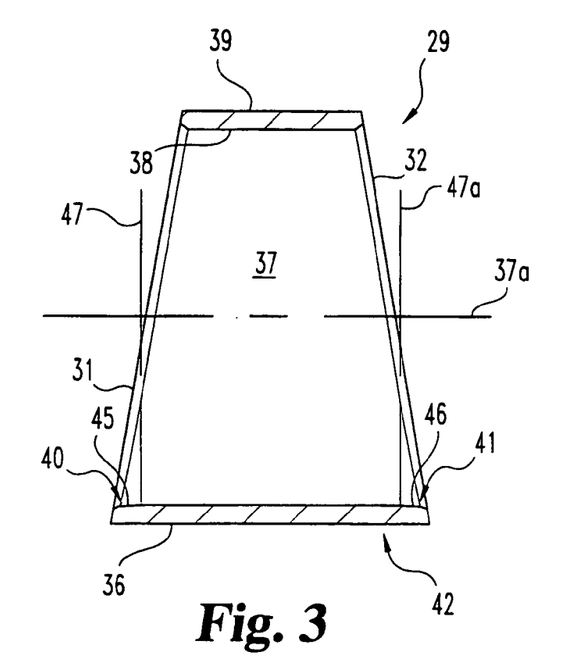
FIG. 3 is a side elevational view in full section of a connecting rod bushing according to a typical embodiment of the present invention.
Figure 4:
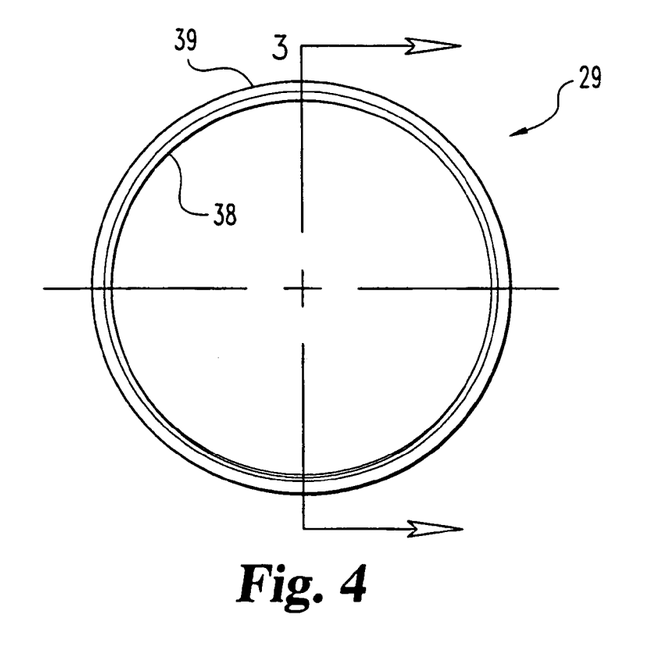
FIG. 4 is a front elevational view of the FIG. 3 bushing.
Figure 5:
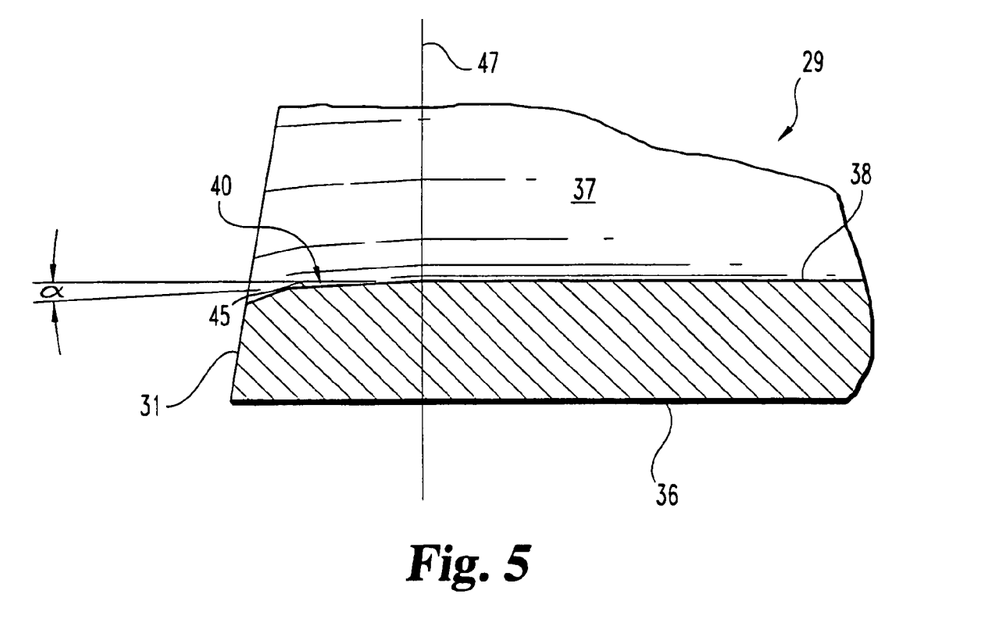
FIG. 5 is an enlarged, partial side elevational view of the FIG. 3 bushing focusing on the inside surface profiling.
Figure 6:
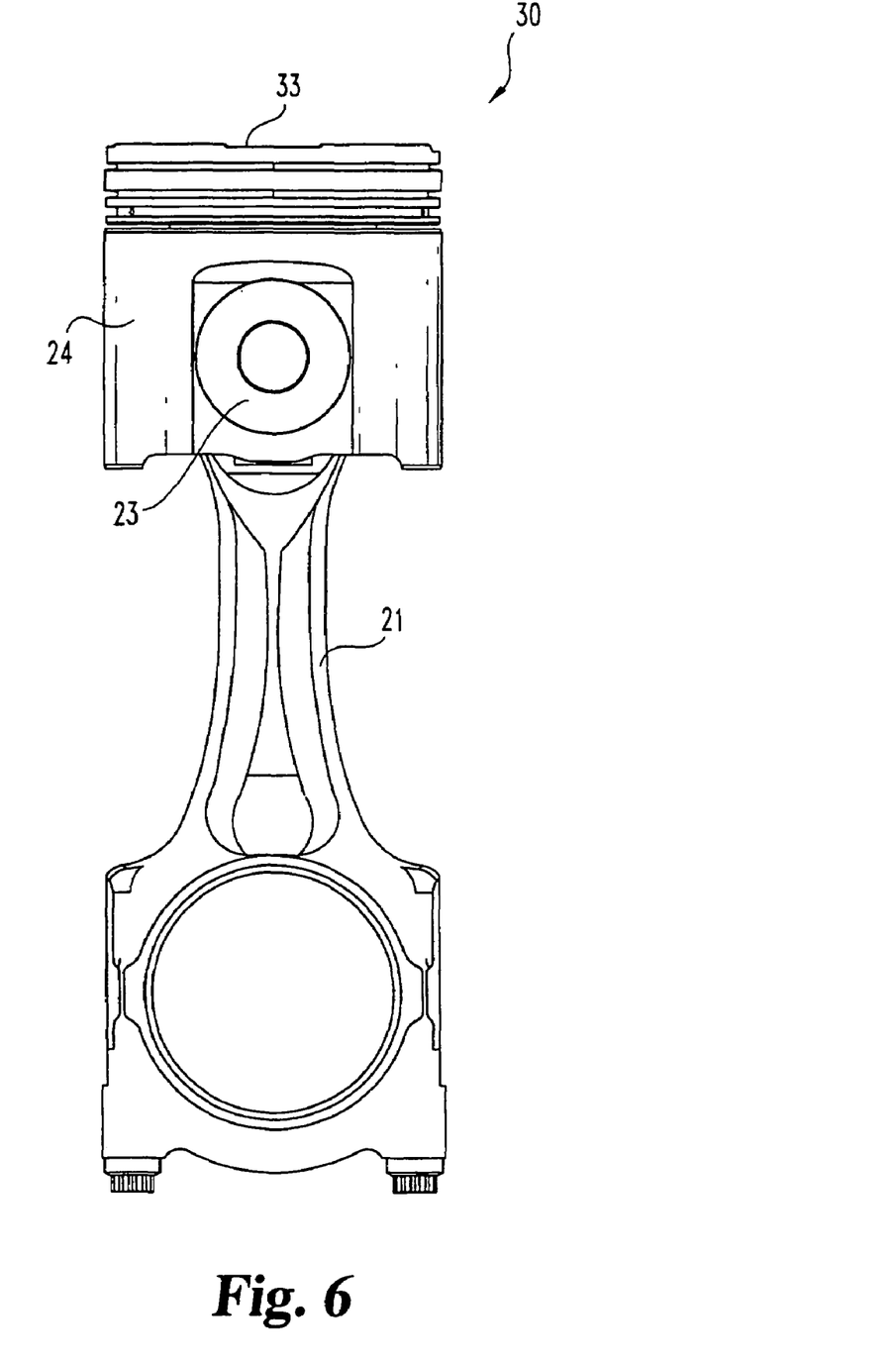
FIG. 6 is a front elevational view of a piston-connecting rod subassembly incorporating the bushing of FIGS. 3–5.

According to the present invention, the current style of connecting rod bushing 22 in piston-end portion 21a is replaced with a modified connecting rod bushing 29 as is illustrated in FIGS. 3, 4, and 5. The assembly of bushing 29 into piston-connecting rod subassembly 30 is illustrated in FIGS. 6, 7, and 8.

Figure 7:
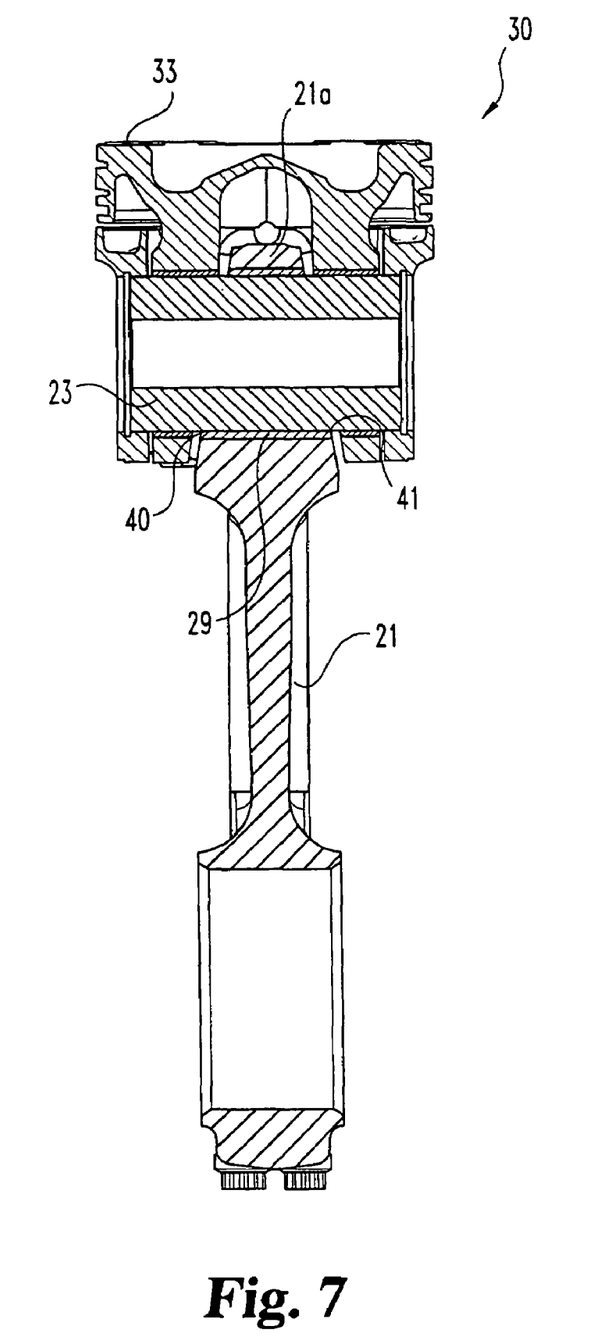
FIG. 7 is a side elevational view in full section of the FIG. 6 subassembly.
Figure 8:
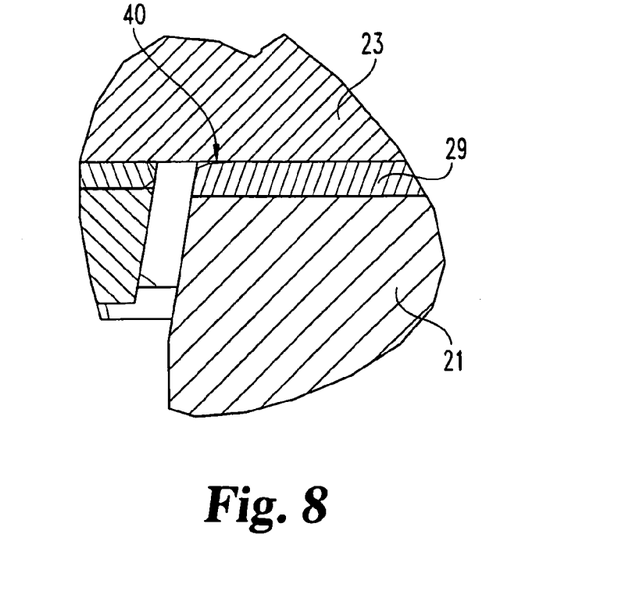
FIG. 8 is a partial, enlarged detail view of the FIG. 7 subassembly showing the inside surface profiling of the bushing of FIGS. 3–5.

Bushing 29 is a generally cylindrical component with oppositely-disposed ends 31 and 32 which are angled relative to the longitudinal centerline of bushing 29 so as to be uniformly and symmetrically converging in the direction of the piston top 33 when installed in a connecting rod that is assembled to a piston (see FIG. 7).

Connecting rod bushing 29 has a main body portion 36 which is cylindrical in form throughout a majority of its length. Main body portion 36 defines a pin bore 37 which is cylindrical throughout a majority of its length. The pin bore 37 is concentric with the longitudinal centerline 37a. The inside diameter surface 38 is concentric with the outside diameter surface 39, except for the relief portions described herein, resulting in a substantially uniform wall thickness for main body 36. The pin bore 37 is profiled (i.e., shaped by machining) such that angled relief portions 40 and 41 are created in surface 38 along the "long" side 42 of bushing 29. Relief portion 40 is adjacent bushing end 31 and relief portion 41 is adjacent bushing end 32.

Each relief portion 40 and 41 has a similar configuration and relief portion 40 is illustrated in enlarged detail in FIG. 5. The profiling described for the pin bore 37 of bushing 29 involves machining the inner surface 38 adjacent each end (and along the "long" side) in order to create a relief space or portion which is defined by angled surface 45 for relief portion 40 and by angled surface 46 for relief portion 41. Angle α denotes the angle of surface 45 relative to the centerline axis 37a of bore 37 which coincides with surface 38 due to their parallel or concentric relationship. In the preferred embodiment, angle α measures 22 minutes, but can likely range from 12 minutes to 32 minutes depending on materials and loads. It is also contemplated and covered by the present invention that a parabolic curvature can replace the straight line surface defining angle α. The precise geometry of the relief portions 40 and 41 is dictated by the geometry of the pin 23 under load. Line 47 denotes the point of intersection of surface 45 with surface 38. It will be understood that due to the angled nature of ends 31 and 32, the geometry of relief portion 40, as illustrated in FIG. 5, changes as the corresponding end converges in the direction of the "short" side of the bushing 29. The geometry of relief portion 41 changes in the same fashion as its corresponding end tapers and converges in the direction of the "short" side.

The end view of bushing 29 as illustrated in FIG. 4 includes relief portion 41 and surface 46. Surface 46 has a crescent-like shape with the maximum thickness or width being at the bottom dead center location based upon the FIG. 4 illustration. The crescent-like shape of surface 46 (and the same for surface 45) tapers to a point and then vanishes where line 47a, with reference to surface 46, intersects end 32. If the ends were not angled, but instead flat so that the two ends would be parallel to each other and perpendicular to centerline 37a, the profiling of surface 38 for relief portions 40 and 41 would take on the appearance of a frustoconical portion concentric with each end.

Due to the end-to-end symmetry of bushing 29, it is acceptable to describe either end of bushing 29 as being representative of the other, opposite end. The counterpart to line 47a is line 47 and each surface 45 and 46 has basically the same end view appearance, based upon what is illustrated in FIG. 4. The bore 37 of the main body portion 36 of bushing 29 between lines 47 and 47a is cylindrical and free of any special profiling or shaping. This is the portion of bushing 29 which is in direct contact with the piston pin 23 during a no load or minimal load condition.

During normal engine operation, substantial loads are placed on the piston pin 23, causing a slight deflection or bending. In earlier designs, without the pin bore profiling as described for bushing 29 according to the present invention, the piston pin deflection resulted in edge loading of the bushing which has been associated with fatigue cracks in the bushing as well as bushing scuffing and seizure. By means of the present invention as described herein, there is an improved load distribution across the bushing length. This in turn allows lower cost materials to be used. The profiling of the bushing bore, as has been described, is shaped, sized, and positioned so as to approximate the shape of the piston pin under load. This allows an even distribution of the load, eliminating edge loading of the bushing. A profiled bore in the connecting rod bushing allows for the use of lower strength and lower cost materials while still satisfying the load capability, reliability, and durability target values for the engine. The profiled bore is able to be machined at little or no additional cost as compared to a full-length cylindrical bore. As one example, in a particular engine style, a solid bronze bushing was necessary in order to satisfy the engine requirements. By using a bushing with a profiled bore according to the present invention, those same requirements were met by a steel-backed, 80% Cu-10% Sn-10% Pb bushing resulting in a material cost savings per engine.

As will be understood, as the particular engine parameters change, including changes in the piston pin size and material, the profiling of the pin bore in the bushing will have to be configured so as to be compatible for the even load distribution which is desired. Accordingly, the first step is to assess the design parameters of the piston, piston pin, and connecting rod, including the loading. From this data, the bending or deflection geometry of the piston pin is determined. Once the piston pin geometry, under load, is known, the specifications for the profiling of the bushing inner surface (bore) are determined. The bushing is then machined in order to match the shape of the piston pin under load.

Figure 9:
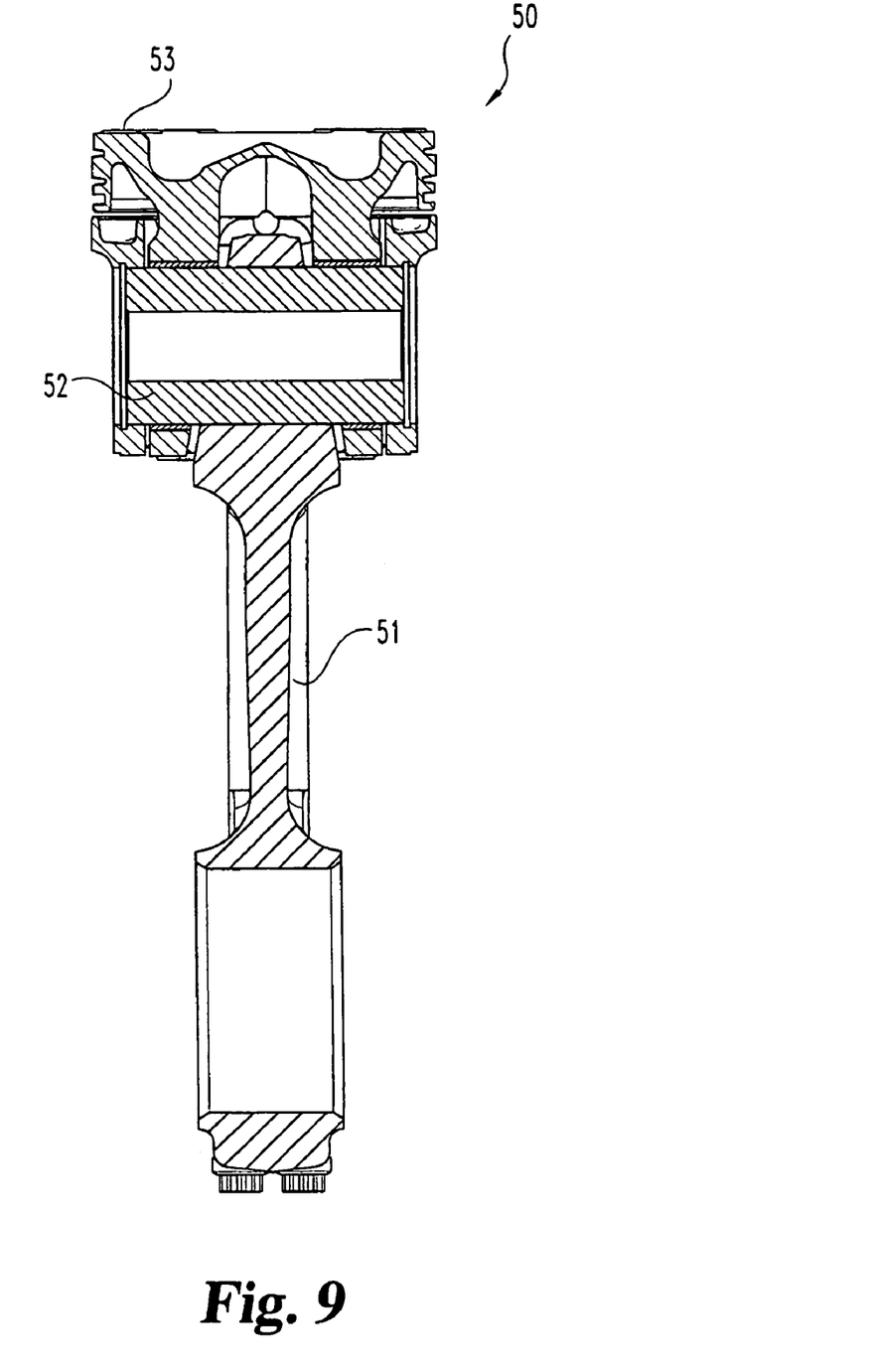
FIG. 9 is a front elevational view in full section of a piston-connecting rod subassembly according to the present invention.
Figure 10:
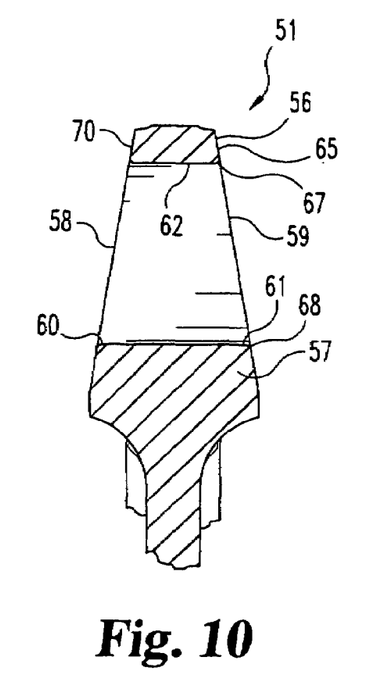
FIG. 10 is a partial, front elevational view in full section of a connecting rod comprising part of the FIG. 9 subassembly according to the present invention.

Now with reference to FIGS. 9 and 10, another embodiment of the present invention is illustrated. Piston and connecting rod subassembly 50 includes a connecting rod 51, piston pin 52, and piston 53. The connecting rod 51 and piston 53 are operably connected together by piston pin 52 and by the retention of piston pin 52 within piston 53. This invention assumes a loose fit between the small end bore of the connecting rod 51 and the piston pin 52. While the FIG. 9 illustration is very similar to what is illustrated in FIGS. 2 and 7 as to these basic components, there is one notable difference. In the embodiment of FIGS. 9 and 10, there is no connecting rod bushing, modified or otherwise. There is however bore end profiling similar to the improvement provided by the first described embodiment of the present invention in modifying the FIG. 2 (prior art) in order to achieve the FIG. 7 construction. Elimination of the connecting rod bushing eliminates the issues of bushing fatigue and corrosion, both of which are concerns with high temperature conditions. Elimination of the connecting rod bushing eliminates the use of bronze and replaces this material with the stronger steel which is typically used for connecting rods.

As illustrated in FIG. 10, the connecting rod 51 has a smaller (lateral length or width) piston-end portion 56 and a wider base portion 57. The bore which is defined by the connecting rod 51 is predominantly cylindrical throughout except at opposite ends 58 and 59 where the inside (i.e., the bored) surface is modified with inner surface/edge profiling. The profiling which actually involves metal removal and thus relief to the bore surface, creates a zone at each end 58 and 59 which is sufficient to accommodate deflection of piston pin 52. The profiling or relief is provided so that as the piston pin experiences deflection, bending longitudinally, it will be received by the clearance of the profiled zones 60 and 61 rather than result in edge loading and a greater risk of fatigue cracks. The elimination of edge loading is an important aspect of the present invention. Edge loading creates high stress points and locations of metal to metal contact which can cause scuffing and seizure at the bore and piston pin interface.

Depending on the geometry of the profiling and the degree or extent of piston pin deflection, it is envisioned that at least a portion of the profiled zones 60 and 61 of the bore surface 62 will actually support the piston pin, under load. When this occurs, it will enable a greater bearing area and improves load distribution across the connecting rod 51 between ends 58 and 59 as compared to a connecting rod without end profiling in the piston-pin bore. By distributing the load over a larger area, there is an increase in the load which can be handled by a particular connecting rod as compared to that same style of connecting rod without the bore end profiling (i.e., profiled zones 60 and 61). However, the greatest improvement comes from the fact that the piston pin, under load, does not contact the outer edges of the bore which create points of contact that tend to decrease the support area between the bore and the piston pin. The present invention allows the center area of the bore to remain in contact with the piston pin for support and improved load distribution. As one option or side benefit of the present invention, a lower strength material, assuming the same size and load, could be used which would in all likelihood mean that a lower cost material could be used. Additionally, the elimination of the bushing means one less component part to be manufactured and assembled and a simplified manufacturing procedure due to the omission of any bushing press fit which would otherwise be required. If the connecting rod material remains the same, then the use of steel in lieu of the bronze material of the bushing results in a greater load carrying capability.

Another aspect of the present invention is the ability to size the connecting rod 51 a little smaller. This results because the connecting rod does not have to withstand the more substantial forces associated with the press fit assembly of the bushing into the connecting rod. If the size of the connecting rod and the material used for the connecting rod remain the same as that associated with the connecting rod without profiling, then the profiling enables the connecting rod to handle an increase in cylinder pressure and the increased load which results.

Figure 11A:
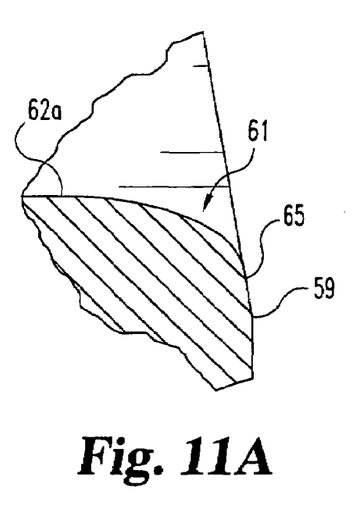
FIG. 11A is a partial, enlarged, front elevational view of one end face of the FIG. 10 connecting rod detailing one form of end profiling according to the present invention.

With reference to FIG. 11A, one of the profiled zones 60 and 61 is illustrated in enlarged form. End 59 and profiled zone 61 have been selected, but the configuration of this profiled zone at end 59 is the same as the configuration of profiled zone 60 and end 58. In this particular embodiment of the present invention, profiled zone 61 is shaped by machining a smooth and continuous parabolic curvature between the cylindrical portion of bore surface 62 and the outer face or end surface 65. End surface 65 is angled or tapers as it extends from base portion 57 to the piston-end portion 56. The parabolic curvature of profiled zone 61 between point 62a and end surface 65 measures between 5 and 35 percent of the overall bore surface 62 length. The parabolic curvature is arranged relative to bore surface 62 such that there is a smooth transition or blend into the cylindrical portion of bore surface 62, as is illustrated in FIG. 11A at point 62a.

Alternatively, the profiled zones can be shaped and created by a series of angled cuts which would be machined into each end of the connecting rod by a chamfering or countersinking operation. What is actually done is to make progressive machining cuts of a conical or frustoconical nature, decreasing the included angle with each successive machining cut. What results are a series of frustoconical sections arranged end-to-end which in the full section view of FIG. 11B have the appearance of straight lines arranged end-to-end with different angles of incline. The frustoconical nature of these individual sections would be understood from the generally cylindrical configuration of bore surface 62 and the general geometry of connecting rods.

Figure 11B:
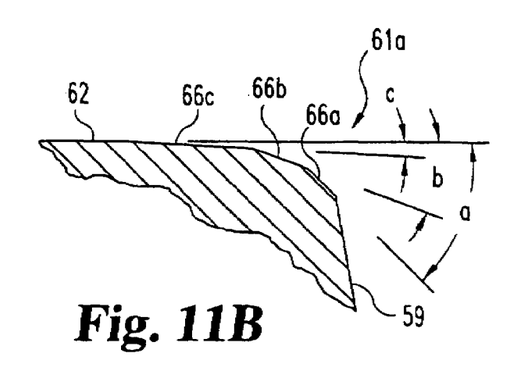
FIG. 11B is a partial, enlarged, front elevational view of one end face of the FIG. 10 connecting rod detailing another form of end profiling according to the present invention.

In the alternative profiling illustrated in FIG. 11B, reference numeral 61a has been used to denote the slight difference in geometric shape of the profiled zones 61 and 61a. Here again, the profiling at end 59 is the same as at end 58 and the shaping is circumferential so that the profiled zones which result are generally annular in form.

Profiled zone 61a is illustrated with three segments, all arranged end-to-end, as described, but virtually any number of individual segments is possible. As would be understood, the greater the number of individual frustoconical sections, the closer we get to a continuous curvature such as that illustrated in FIG. 11A. Assuming that the countersink angle is defined as the included angle, then the first cut has the largest countersink angle of approximately 1.0 degree. This initial machining cut creates frustoconical portion 66a. The next machining step which uses a smaller countersink angle of approximately 30 minutes creates frustoconical portion 66*b*. The third and final machining step which uses the smallest countersink angle of the three of approximately 8 minutes creates frustoconical portion 66*c*. The corresponding half angle measurements are denoted as angles a, b, and c in FIG. 11B. The longitudinal extent of zone 61*a* measures between 5 and 35 percent of the overall bore surface 62 length.

Due to width differences between portion 56 and portion 57, portion 56 will not receive the same degree of profiling as portion 57 and this is true for both profiling styles. However, the degree of piston pin deflection is less in the pin portion which is located adjacent edge 67 than the degree of piston pin deflection in the pin portion located adjacent edge 68. The differences in the degree or extent of profiling between portion 56 and portion 57 is not abrupt. Rather, there is a smooth and gradual transition from portion 57 to portion 56 which corresponds to the inclined or tapering nature of ends 58 and 59 as defined by end surfaces 65 and 70.

While the end profiling or shaping which results in profiled zones 60 and 61 (as well as 61*a*) can be used with just the bare metal of the connecting rod, the preferred embodiment includes a thin surface coating or surface treatment in order to provide greater wear properties and some lubricity which would typically be the properties provided by the bushing. While the coating does not necessarily contribute to the load carrying capacity, it does help the initial break in and early running between the piston pin and the bore. Due to the crankshaft action and the fixed axial travel of the piston, there is relative motion between piston pin 52 and the connecting rod 51. In order to achieve a smoothness of rotation, it is important to coat or treat the bore surface 62, including the bore surface portions of the profiled zones 60 and 61, as well as 61*a*. Suitable surface treatments or coatings include materials such as titanium nitride, manganese phosphate, and chromium.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An engine cylinder piston and connecting rod assembly comprising:
   a piston;
   a connecting rod;
   a single piston pin constructed and arranged for connecting together said piston and said connecting rod, said single piston pin being subjected to a load during reciprocation of said connecting rod, resulting in piston pin deflection; and
   wherein said connecting rod having a first portion assembled into said piston and defining a bore for receipt of said piston pin, said connecting rod having a first end and an opposite second end, said bore extending between said first end and said second end, said bore including a generally cylindrical bore portion, said connecting rod including as part of said bore a first profiled bore section adjacent said first end and a second profiled bore section adjacent said second end, said generally cylindrical bore portion being positioned between said first and second profiled bore sections, each of said first and second profiled bore sections being constructed and arranged with a size, shape, and location so as to approximate the deflection shape of said single piston pin under load.

2. The engine cylinder piston and connecting rod assembly of claim 1 wherein said first profiled bore section and said second profiled bore section each have a curved surface.

3. The engine cylinder piston and connecting rod assembly of claim 2 wherein a surface coating is applied to said bore.

4. The engine cylinder piston and connecting rod assembly of claim 1 wherein said first profiled bore section and said second profiled bore section are each shaped with a plurality of end-to-end frustoconical sections.

5. The engine cylinder piston and connecting rod assembly of claim 4 wherein a surface coating is applied to said bore.

6. A connecting rod for use in an engine cylinder piston and connecting rod assembly including a single piston pin for connecting together said piston and said connecting rod, said single piston pin being subjected to a load during reciprocation of said connecting rod, resulting in piston pin deflection, said connecting rod comprising:
   a main body portion defining a bore for receipt of said single piston pin, said main body portion having a first end and opposite thereto a second end, said bore extending between said first end and said second end, said bore including a generally cylindrical bore portion;
   a first profiled bore section adjacent said first end, said first profiled bore section being defined by said main body portion and comprising a portion of said bore; and
   a second profiled bore section adjacent said second end, said second profiled bore section being defined by said main body portion and comprising a portion of said bore, said generally cylindrical bore portion being positioned between said first and second profiled bore sections, wherein each of said first and second profiled bore sections being constructed and arranged with a size, shape, and location so as to approximate the deflection shape of said single piston pin under load.

7. The connecting rod of claim 6 wherein said first profiled bore section and said second profiled bore section each have a curved surface.

8. The connecting rod of claim 7 wherein a surface coating is applied to said bore.

9. The connecting rod of claim 6 wherein said first profiled bore section and said second profiled bore section are each shaped with a plurality of end-to-end frustoconical sections.

10. The connecting rod of claim 9 wherein a surface coating is applied to said bore.

* * * * *